Sept. 7, 1937.   C. E. CARPENTER   2,092,302
DOUGHNUT MACHINE AND THE LIKE
Original Filed Jan. 8, 1934   3 Sheets-Sheet 1

Inventor:
Charles E. Carpenter
By Thos. A. Rampft
Atty.

Sept. 7, 1937.   C. E. CARPENTER   2,092,302
DOUGHNUT MACHINE AND THE LIKE
Original Filed Jan. 8, 1934   3 Sheets-Sheet 2
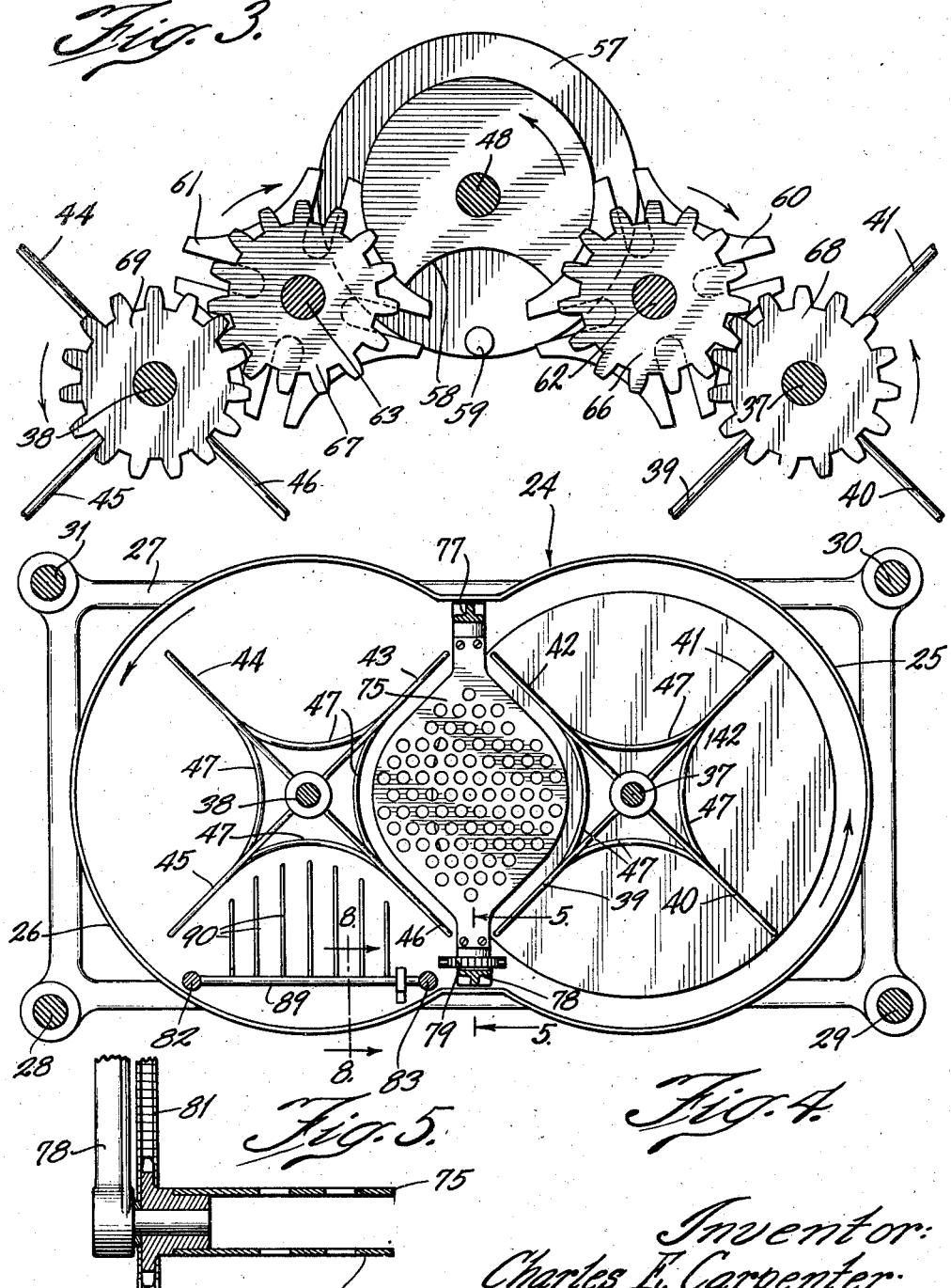

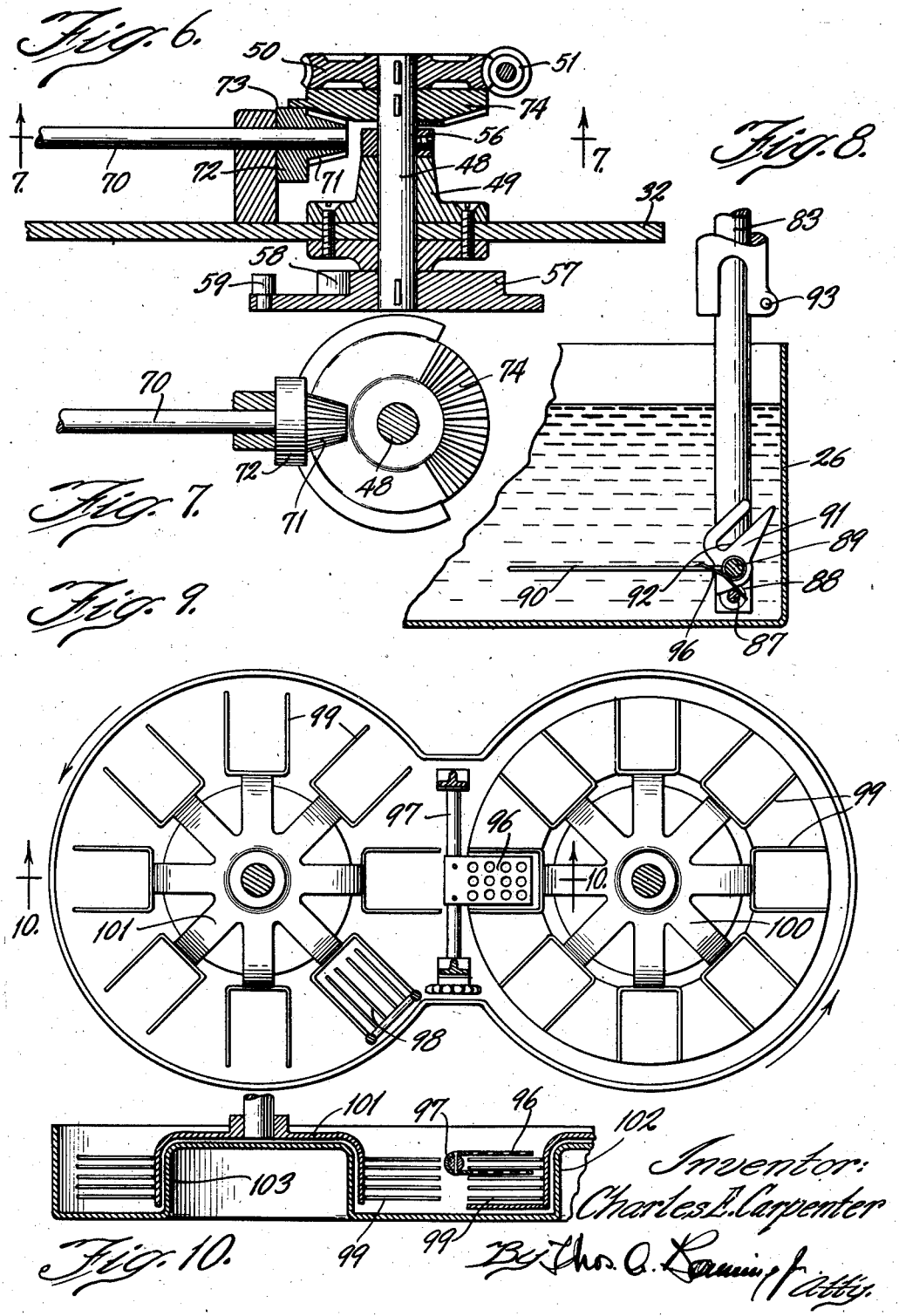

Patented Sept. 7, 1937

2,092,302

UNITED STATES PATENT OFFICE 2,092,302

DOUGHNUT MACHINE AND THE LIKE

Charles E. Carpenter, Crystal Lake, Ill.

Application January 8, 1934, Serial No. 705,728
Renewed August 23, 1935

16 Claims. (Cl. 53—7)

This invention relates to improvements in doughnut machines and the like. The invention has reference especially to improvements in the cooking devices wherein the cooking operations are carried on, as well as the combination of these devices with the dough-batch forming and dropping devices whereby the dough batches are formed and dropped into the frying pan.

Objects of the invention are to provide a doughnut machine in which there is provided novel means for advancing the cooking articles; novel means for turning the doughnuts during the cooking operations; novel means for supporting the doughnuts during the cooking operations; novel means for supporting the doughnut advancing and turning and delivering mechanisms; novel means for supporting the pan in which the frying grease is carried; and in general to improve the construction and operation of such machines.

Other objects and uses of the invention will appear from a detailed description of the same, which consists in the features of construction and combinations of parts hereinafter described and claimed.

In the drawings:

Figure 3 shows a horizontal section on the line 3—3 of Figure 2 looking in the direction of the arrows, and it shows especially the driving gears and Geneva movements;

Figure 4 shows a horizontal section below the position of Figure 3;

Figure 5 shows a fragmentary section on the line 5—5 of Figure 4, looking in the direction of the arrows, but on enlarged scale, and shows the driving arrangement for the turner;

Figure 6 shows a fragmentary section on the line 6—6 of Figure 1 looking in the direction of the arrows, and it shows the driving arrangements for the cam block of the Geneva movements and also the intermittent drive for the turner and for the ejector;

Figure 7 shows a section on the line 7—7 of Figure 6, looking in the direction of the arrows;

Figure 8 shows a fragmentary section on the line 8—8 of Figure 4 looking in the direction of the arrows, and it shows the ejector device;

Figure 9 shows a plan view of a modified arrangement in which there are provided a greater number of pockets or cells in each conveyor;

Figure 10 shows a vertical section on the line 10—10 of Figure 9, looking in the direction of the arrows;

Figure 1:
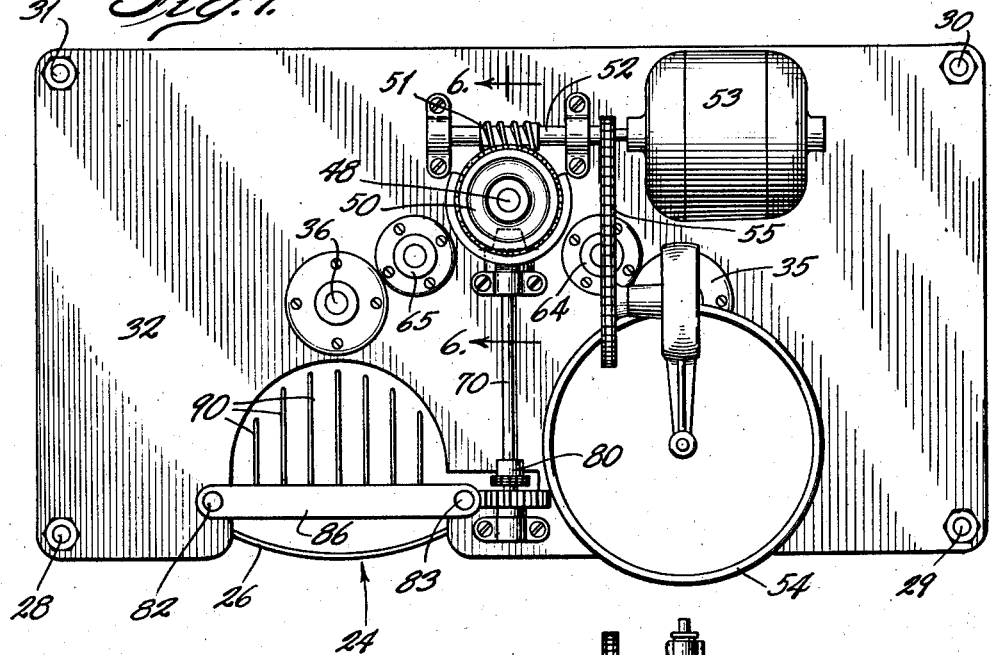
Figure 1 shows a plan view of a machine embodying the features of the invention.

Referring first to the form shown in Figures 1 to 8, inclusive, there is provided a grease pan 24, which is of generally double circular form, including the circular end sections 25 and 26. The circular end sections are so formed that they overlap a certain extent where they come together, with the result that the total length of the pan is less than it would be in case such overlap were not provided. This pan is shown as being open in its top portion, but in some cases it may be provided with a suitable cover plate.

The frying pan rests on and is supported by a horizontal bracket or frame 27. This frame is carried by the four corner posts 28, 29, 30, and 31, which, at their upper ends are connected together by a top plate 32. The frame 27 may be slid up and down on these corner posts so as to accordingly raise and lower the pan 24. The frame is also provided with suitable set screws 33 by means of which it may be secured in the raised position, and preferably there are also provided lugs or the like 34 on the corner posts for limiting the upward movement of the frame and frying pan to the proper position.

Figure 2:
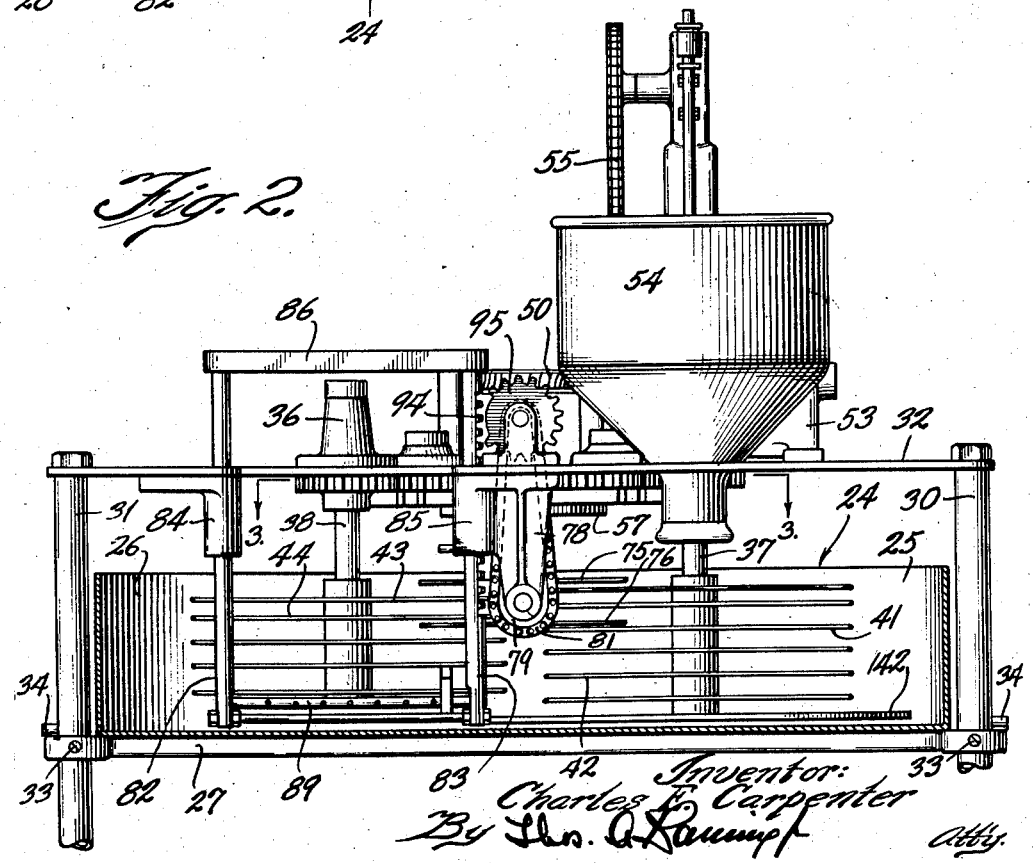
Figure 2 shows a side elevation corresponding to Figure 1.

The cover plate 32 is provided with journals 35 and 36 over the centers of the two circular pan sections, and the shafts 37 and 38 are journalled therein, and extend downwards so that when the pan is in position these shafts reach relatively close to the floor of the pan as evident from Figure 2. The paddle conveyors are carried by these shafts. In the form shown in the figures these paddles are in the form of rods or fingers which extend out radially from the shafts, but manifestly, there may be used solid paddles in place thereof, as will presently be evident. In the form illustrated, these paddles have the radially extending fingers 39, 40, 41, and 42 for the shaft 37, and 43, 44, 45, and 46, for the shaft 38. Thus there are four paddles on each shaft, lying ninety degrees apart, and the two shafts normally stand in such positions as illustrated in Figures 3 and 4 wherein the paddles of the two conveyors establish a pocket between them. That is to say, the conveyors travel intermittently, and during each condition of rest they occupy positions such as to bring one pocket of each conveyor into register with a pocket of the other conveyor, so that these two pockets then overlap, leaving all the other pockets facing outwardly as shown in the figures referred to. In some cases it will be found desirable to provide central webs such as 47 between the central portions of the paddles. These webs serve to prevent the dough batches from moving inwardly too far to positions where they might become deformed during the early stages of the cooking operation.

There is a main drive shaft 48 which extends up vertically through the top plate 32 and is journalled therein in the journal 49. This shaft has on its upper end the worm gear 50 which is driven by the worm 51 on the shaft 52, which shaft is in turn driven by the motor 53 in continuous fashion. This shaft 52 also serves to drive the doughnut batch former of the dough hopper 54 by means of a chain drive 55, so that the dough batch former and the other devices are all driven by the same continuously rotating motor 53. The details of the dough batch former are not set out herein for the reason that they do not constitute a portion of the present invention, and there are many forms of these devices which may be used in the present machines. There is shown a collar 56 (see Figure 6) on the shaft 48 which bears against the bearing 49 and retains the shaft at the proper elevation.

The lower end of the shaft 48 carries the circular cam plate 57 constituting a portion of a Geneva movement. This plate also has the notched section 58, and the pin 59 located in this notch, so that the rotation of the shaft 48 carries these parts around in continuous fashion. At the two sides of the cam plate are located the star wheels 60 and 61. These are of conventional form, being provided with the star notches or slots into which the pin 59 enters, and being provided with the outwardly facing surfaces which engage the cam plate to hold the star wheels locked in the intermediate positions. These star wheels are carried by the vertical shafts 62 and 63 which extend through the top plate 32 and are carried by the bearings 64 and 65 as shown in Figure 1. These shafts also carry the gears 66 and 67 which mesh with the gears 68 and 69 on the conveyor shafts 37 and 38 respectively. Thus the rotation of the shaft 48 serves to turn the conveyors intermittently through the medium of the Geneva movements. Furthermore, it will be noted that both of the conveyors travel in the same direction or rotation, that is, counter-clockwise, and therefore their paddles travel in opposite directions at the location where they overlap in their travels.

It will be furthermore noted that the two star wheels are located in positions substantially one hundred twenty degrees apart around the periphery of the cam plate, so that the shiftings of the two star wheels occur substantially one hundred twenty degrees apart. There is then a pause of substantially two hundred forty degrees after the second star wheel has been shifted before the first star wheel is again shifted. It will also be noted that the right hand shaft 37 is first shifted, and then the left hand shaft.

There is a shaft 70 journalled on the top plate 32. This shaft 70 carries at its rear end the pinion 71. The shaft 70 also carries a cam plate or block 72 having at one position the flattened surface 73 (see Figure 6). The shaft 48 carries the mutilated gear 74 which will engage with and turn the pinion 71 one revolution each time the shaft 48 makes a revolution, and the mutilation of the gear 74 is so placed that the shaft 70 is thus turned during the interval of two hundred forty degrees when both of the conveyor shafts 37 and 38 are stationary with the paddles in such a position as shown in Figure 4. The shaft 70 is for operation of the turner and ejector devices.

The turner comprises the two plate arrangement shown in Figures 2 and 4. These are the plates 75 and 76 located parallel to each other with a separation sufficient to receive a doughnut between them, and these plates are joined together in their end portions so that they may be rotated in harmony on a horizontal axis extending across the machine between the two conveyors. There are the downwardly extending brackets such as 77 and 78 which are carried by the top plate 32 and the two end portions of the turner are journalled in these brackets, as clearly evident from Figures 2 and 4. There is a sprocket 79 carried by the turner at one end, and a similar sprocket 80 is properly located on the shaft 70 above the sprocket 79. A chain 81 connects these sprockets together. The ratio of the two sprocket sizes is such that although the shaft 70 makes a complete rotation each time, still the turner only makes a half rotation.

It is also noted at this point, that the arms or fingers of the two paddles sweep through the turner as the conveyors are turned, and the turner plates are located at the proper elevation to receive the floating doughnut between them. In case the paddles of the conveyors should be solid, they would nevertheless sweep through the turner and between the plates thereof. It will be noted that the turner plates are of such form as to generally conform to the shape of the pocket between the two conveyors, so that the doughnut is well received by the turner, and there is no possibility of the doughnut becoming damaged between the parts.

At the front side of the machine, and in proper relationship to the delivery pocket of the second conveyor, there are the two rods which extend downwardly into the pan, being the rods 82 and 83. These rods are extended through the bearings 84 and 85 mounted on the top plate 32, and a cross bar 86 is provided for joining the upper ends of the rods together. The lower ends of the rods carry the rod 87, on which there are journalled the fingers such as 88 (see Figure 8) for the ejector. A rod 89 extends between these fingers 88, and it carries the fingers 90 of the ejector. The rod 89 also carries at one end the finger 91 which is slotted with the slot 92, and a pin 93 on a stationary part is adapted to receive the slot 92 when the ejector is raised. The raising of the ejector is effected by raising the rods 82 and 83, whereupon the ejector rises until the slot 92 engages the pin 93, and then the ejector is rotated or rocked over and outwardly to turn the doughnut out of the frying pan.

The raising of the ejector in the above manner is effected by the following arrangement; there is a rack bar 94 formed on the rod 83 (see Figure 2), and the shaft 70 carries the mutilated gear 95 in position to engage and raise the rack bar at the proper time. When the rack bar has been completely raised the mutilation comes around to again release the rack bar and allow the ejector to fall. This operation takes place at the same time as the operation of the turner. If desired, a spring 96 may be provided for restoring the ejector to the horizontal position, but it will also be noted that the engagement of the slot 92 with the pin 93 on the back stroke will also effect such restoration.

It will be noted that in the operation of this machine the doughnuts are dropped into the pockets of the right hand conveyor, which advances intermittently in counterclockwise direction, that when the position of the turner is reached the doughnuts are swept by the left hand conveyor from the turner, and they are then carried intermittently by said conveyor also in counterclockwise direction to the position of the ejector, where they are raised and removed from the frying pan. Analysis shows that at all times all of the pockets of the conveyors are filled with doughnuts, but due to the fact that one pocket of the right hand conveyor registers with one pocket of the left hand conveyor, there are seven doughnuts simultaneously cooking. It will also be noted that there is a longer cooking interval for the doughnuts while they are on the first or initial side since the turning operation takes place at the fourth pocket of the first conveyor, and after the turning operation has been made there are three pockets travelled in the second conveyor. This ensures proper cooking of the doughnuts, since it is proper that they should be cooked a longer interval before they are turned than after they have been turned.

In the modified arrangement of Figures 9 and 10, there is shown an arrangement somewhat similar to that of the first group of figures. In the present case, however, there is provided a greater number of pockets or cells for each conveyor, so that a greater capacity of the machine is provided. In the present case, also the turner 96 rocks on the shaft 97, and removes the doughnut from the right hand conveyor to the left hand conveyor. Likewise the ejector 98 operates in the last pocket of the second conveyor.

In the present case, the pockets of the conveyors are formed by the U-shaped members 99 which are carried by the central spiders 100 and 101. The arms of these spiders are located high up so that the frying pan may be provided with the central circular walls or partitions 102 and 103 which reduce the amount of grease which it is necessary to provide in the pan.

While I have herein shown and described only certain embodiments of my invention, still I do not intend to limit myself thereto except as I may do so in the claims.

I claim:

1. In a machine of the class described, the combination of a frying pan, a pair of vertical shafts extending downwardly thereinto, paddles on said shafts reaching out in horizontal fashion therefrom, the shafts and paddles being so proportioned that the paths of the paddles intersect between the shafts, means for intermittently advancing the shafts and paddles simultaneously to intermittently bring a pocket of each shaft into registry with a pocket of the other shaft between the shafts, means for turning the doughnuts in such registered pockets during the interval of pause of the shafts, comprising a pair of parallel plates mounted for rotation on a horizontal transversely extending axis midway between the shafts, the paddles of both shafts sweeping through such turner when the shafts are rotated, and means for removing cooked doughnuts from the last pocket of the series, substantially as described.

2. In a machine of the class described, the combination of a frying pan, a pair of vertical shafts extending downwardly thereinto, paddles on said shafts reaching out in horizontal fashion therefrom, the shafts and paddles being so proportioned that the paths of the paddles intersect between the shafts, means for intermittently advancing the shafts and paddles simultaneously to intermittently bring pockets of the two shafts into register between the shafts, means for turning the doughnuts in such registered pockets during the interval of pause of the shafts, and means for removing cooked doughnuts from the last pocket of the series, substantially as described.

3. In a device of the class described, the combination of a pair of rotating conveyors comprising paddles mounted for rotation on vertical axes extending downwardly, a frying pan into which said conveyors are located, the arrangement being such that the paths of travel of the paddles intersect at a position between the axes of rotation of the conveyors, turner means located between the conveyors and within the location of intersection of the paths aforesaid, said turner comprising a pair of parallel plates normally standing in horizontal fashion and mounted for rotation on a horizontally transversely extending axis, and means for removing cooked doughnuts from the last pocket of the series, substantially as described.

4. In a device of the class described, the combination of a pair of conveyors each comprising a series of radially extending paddles mounted for rotation on a vertically extending axis, the arrangement being such that the paths of travel of the paddles intersect between the axes of the two conveyors, means for intermittently advancing the conveyors to bring the pockets of the two conveyors into registry at a location between the two conveyors, means for turning the doughnuts within such location during an interval of pause in the conveyor rotations, and means for removing the cooked doughnuts from the last pocket of the series, substantially as described.

5. In a machine of the class described, the combination of two conveyors each comprising a series of radially extending paddles establishing pockets between them, a pan in which said conveyors are mounted for rotation, the arrangement being such that the paddles of the two conveyors cross each other during their rotations, means for turning the doughnuts between the two conveyors during an interval of pause in the movements of the conveyors, means for intermittently advancing the conveyors, and means for removing cooked doughnuts from the last pocket of the series, substantially as described.

6. In a machine of the class described, the combination of two conveyors mounted for travel in closed paths of travel which intersect each other, a frying pan in which said conveyors travel, means for advancing the conveyors intermittently, turning means located between the conveyors at the position of intersection of their paths of travel, means for turning said turning means during intervals of pause in the travel of the conveyors, and means for removing cooked doughnuts from the last pocket of the series, substantially as described.

7. In a machine of the class described, the combination of two conveyors mounted for travel on closed paths of travel which intersect each other, a frying pan in which said conveyors travel, means for advancing the conveyors intermittently, turning means located between the conveyors at the position of intersection of their paths of travel, and means for removing cooked doughnuts from the device, substantially as described.

8. In a machine of the class described, the combination of a pair of dough batch advancing devices located in co-operative relationship with respect to each other, means for driving said devices in timed relationship, means for turning over dough batches between said devices, means for forming and delivering dough batches to said devices, means for removing cooked articles from one of said advancing devices, means for supporting all of said devices from above, a grease pan for grease wherein certain of said devices are submerged, and means for supporting said grease pan beneath said devices and for permitting downward removal of said grease pan without interference from said devices, substantially as described.

9. In a machine of the class described, the combination of dough batch forming means, dough batch advancing means, dough batch turning means, and means for removing cooked articles from said devices, means for driving all of said devices in timed relationship with respect to each other, and means for supporting all of said devices from above, a grease pan for grease wherein certain of said devices are submerged, said pan being movable up and down beneath the first mentioned devices for placement and removal of said pan into and from working position with respect to the first mentioned devices, and means for supporting the pan in working position, substantially as described.

10. In a machine of the class described, the combination of dough batch forming means, dough batch advancing means, dough batch turning means, and means for removing cooked articles from said devices, a common support for all of said devices located above the position of the advancing and the turning and the removing means aforesaid, and a frying pan for grease movable vertically beneath all of said devices into and out of co-operative relationship with respect to the same, and means for supporting said pan in working position, substantially as de- described.

11. In a machine of the class described, the combination of two advancing devices for dough batches located in close proximity to each other and travelling in paths of travel which intersect each other, dough batch turning means located between said devices and at the position of intersection of said paths of travel, dough batch forming means in position to deliver dough batches to one of said advancing means, and means for removing cooked articles from the other of said advancing means, together with means for intermittently driving all of said devices to advance one of said advancing devices while the other advancing devices and the turning and removing means are stationary, then to actuate the turning and removing means while both of the advancing devices are stationary, and then to advance the other of the advancing devices while the first mentioned advancing device and the turning and removing means are stationary, substantially as described.

12. In a machine of the class described, the combination of a suitable frying pan for grease, a pair of movable conveyors working therein, each conveyor being provided with a series of doughnut receiving pockets, the conveyors being mounted for movement in intersecting relationship in a portion of their travel, means for intermittently driving the conveyors in such intersecting relationship, whereby the pockets of each conveyor register with pockets of the other conveyor at such position, together with means for turning over cooking articles at such registering position, substantially as described.

13. In a machine of the class described, the combination of a suitable pan for frying liquor, a pair of conveyors located in said pan and each including a series of pockets for cooking articles, the pockets of each conveyor traveling in a closed circuit of travel and the circuits of travel of the two conveyors intersecting each other at a given point in their paths of travel, means for driving the conveyors intermittently in such intersecting relationship, together with means for turning over doughnuts or the like at such position of intersection, substantially as described.

14. In a machine of the class described, the combination of a pan for frying liquor, a pair of conveyors mounted in said pan and including pockets traveling in closed paths of travel, said paths of travel intersecting each other at a given point, means for driving the conveyors intermittently in such intersecting relationship, and means for turning over doughnuts at such position of intersection of the paths of travel, substantially as described.

15. In a machine of the class described, the combination of two conveyors mounted for travel in closed paths of travel which intersect each other, a frying pan in which said conveyors travel, means for intermittently advancing the conveyors in such intersecting relationship, turning means located between the conveyors at the position of intersection of their paths of travel, and means for removing cooked doughnuts from the device, substantially as described.

16. In a doughnut machine, a pan for frying liquor, a pair of conveyers in said pan adjacent each other, each conveyer describing a closed circuit, each conveyer forming a plurality of pockets, means for intermittently operating said conveyers so that a pocket of one conveyer is presented to a pocket of the other conveyer during rest periods, doughnut turning means located between said conveyers, means for operating said turning means during rest periods for transferring and turning a blank from one pocket in the other conveyer, and means for ejecting said blanks.

CHARLES E. CARPENTER.